United States Patent
Langgood et al.

(10) Patent No.: US 7,643,288 B2
(45) Date of Patent: Jan. 5, 2010

(54) FOLDABLE COMPUTER WITH PARTIALLY VISIBLE DISPLAY WHEN CLOSED

(75) Inventors: John K. Langgood, Cary, NC (US); Thomas Francis Lewis, Raleigh, NC (US); Kevin Michael Reinberg, Chapel Hill, NC (US); Kevin Shayne Dwayne Vernon, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 408 days.

(21) Appl. No.: 11/376,376

(22) Filed: Mar. 14, 2006

(65) Prior Publication Data

US 2007/0217138 A1    Sep. 20, 2007

(51) Int. Cl.
*H05K 5/00* (2006.01)
(52) U.S. Cl. .......................... 361/683; 454/359; 463/43
(58) Field of Classification Search ............... 463/16, 463/43; 345/168, 169, 649; 454/358, 359; 361/679–687, 724–727
See application file for complete search history.

(56) References Cited

U.S. PATENT DOCUMENTS

| 4,513,512 A * | 4/1985 | Fischer ..................... 33/471 |
| 4,918,632 A | 4/1990 | York ........................ 361/680 |
| D356,550 S | 3/1995 | Mizusugi ................ D14/341 |
| D357,000 S | 4/1995 | Takahashi ............... D14/341 |
| 5,432,510 A | 7/1995 | Matthews .................. 341/20 |
| 5,644,516 A * | 7/1997 | Podwalny et al. ......... 361/681 |
| 5,796,575 A | 8/1998 | Podwalny et al. ......... 361/681 |
| D451,918 S | 12/2001 | Kizu ....................... D14/341 |
| 6,381,126 B1 | 4/2002 | Yoshimoto et al. ........ 361/683 |
| 6,421,235 B2 | 7/2002 | Ditzik ..................... 361/683 |
| D466,115 S | 11/2002 | Hawkins et al. .......... D14/345 |
| 6,549,503 B2 * | 4/2003 | Matos ...................... 720/600 |
| 6,989,984 B2 * | 1/2006 | Sutton et al. ............. 361/680 |
| 7,161,800 B2 * | 1/2007 | Tanaka et al. ............ 361/683 |
| 2003/0001817 A1 * | 1/2003 | Jeon ........................ 345/156 |

* cited by examiner

*Primary Examiner*—Hung V Duong
(74) *Attorney, Agent, or Firm*—John L. Rogitz

(57) ABSTRACT

A portable computer has a base supporting a keyboard and a cover with a display screen, with the cover being foldable away from the base to an open configuration to view the entire screen and operate the keyboard. The cover can also be folded flush against the base to a closed configuration. A portion of the screen remains viewable in the closed configuration, either by virtue of a window formed in the base or by virtue of the portion of the cover extending past the base.

11 Claims, 1 Drawing Sheet

FOLDABLE COMPUTER WITH PARTIALLY VISIBLE DISPLAY WHEN CLOSED

FIELD OF THE INVENTION

The present invention relates generally to portable computers that can be folded open and closed.

BACKGROUND OF THE INVENTION

Portable computers such as the Thinkpad® have been provided that conveniently afford computer access virtually anywhere a user might want to bring the computer. Typically, to use the computer a user opens it by folding a display panel away from a base that contains a keyboard, hard disk drive, etc. When the computer is not in use the display panel is folded back flush against the base both to protect the keyboard and display and to provide a thin form configuration that is convenient for carrying.

As recognized herein, it might be desirable to use the computer for limited purposes (e.g., as a cell phone, as a music player) while the user is moving, driving, or otherwise in a position that renders opening up the computer infeasible or impractible. As further understood herein, owing to the inability to see the display when the computer is closed operating the computer currently is not possible or is rendered excessively difficult without opening the computer.

SUMMARY OF THE INVENTION

A portable computer includes a base supporting a key entry device and a cover supporting a visual display screen. The cover is foldably engaged with the base between an open configuration, wherein the key entry device on the base is exposed for user manipulation and the entire screen is exposed for viewing by a user, and a closed configuration, wherein the cover is folded flush against the base and a portion of the screen can be seen when the computer is oriented with the base closest to a viewing person.

In one embodiment the base defines a periphery and is formed with a window entirely inside the periphery. The portion of the screen is viewable through the window when the computer is in the closed configuration. A transparent pane that may be magnifying can be disposed in the window. Alternatively, the portion of the screen is viewable in the closed configuration by virtue of extending beyond the periphery of the base.

In another aspect, a portable computer includes a base supporting an input device and a cover supporting a screen. The cover is pivotably engaged with the base between an open configuration, wherein the input device on the base is exposed for user manipulation and the entire screen is exposed for viewing by a user, and a closed configuration, wherein the cover is folded flush against the base. Means are provided for exposing a portion of the screen for viewing when the computer is in the closed configuration.

In still another aspect, a method for operating a computer includes folding a cover having a screen flush against a base having an input device to establish a closed configuration, and viewing a portion of the screen past the base in the closed configuration.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
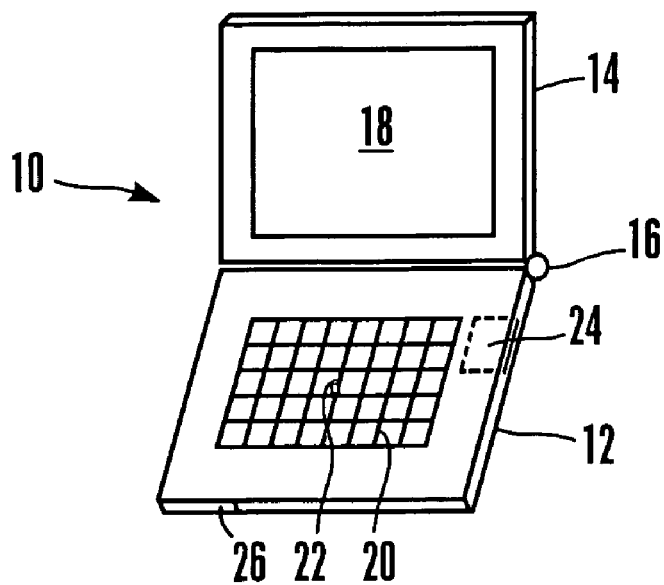
FIG. 1 is a perspective view of the present portable computer in the open configuration, showing internal portions of the base in phantom.
Figure 2:
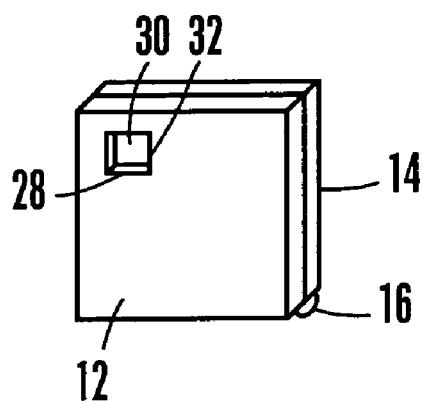
FIG. 2 is a perspective view of a first embodiment of the computer in the closed configuration, in which a part of the display can be seen through a window formed in the base.
Figure 3:
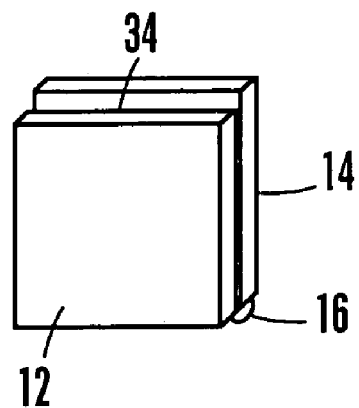
FIG. 3 is a perspective view of a second embodiment of the computer in the closed configuration, in which a part of the top edge of the display extends beyond the base for viewing.

Referring initially to FIG. 1, a portable computer is shown, generally designated 10, that includes a base 12 and a cover 14 that can be pivotably moved relative to the base 12 about a hinge 16 or other folding/pivoting coupling mechanism. Specifically, the cover 14 can be moved relative to the base 12 to the open configuration shown in FIG. 1, in which a visual display screen 18 on the cover 14 can be seen in its entirety and in which an input device or devices such as but not limited to a keyboard 20 and joystick 22 on the base 14 are exposed so that a user can manipulate them. Also, the cover can be folded to a closed configuration shown in two different embodiments in FIGS. 2 and 3, in which the cover 14 is flush against the base 12, substantially covering the input devices of the base 12. The base 12 may also include one or more disk drives 24 and a processor 26.

Figure 4:
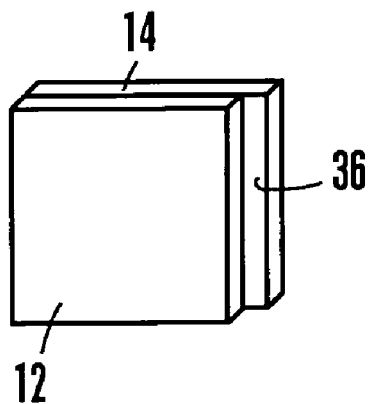
FIG. 4 is a perspective view of a third embodiment of the computer in the closed configuration, in which a part of the side edge of the display extends beyond the base for viewing.
Figure 5:
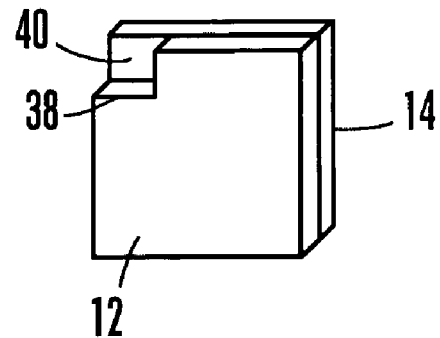
FIG. 5 is a perspective-view of a fourth embodiment of the computer in the closed configuration, in which a window is formed in a corner of the base so that part of the display behind the corner can be seen.

In accordance with the present invention, when the computer 10 is in the closed configuration, a portion of the screen 16 can be seen by a person when the computer is oriented with the base 12 closest to a viewing person is shown in FIGS. 2-5. In the embodiment shown in FIG. 2, this is accomplished by establishing a transparent window entirely within the periphery of the base 12 as shown, so that a portion 30 of the screen 14 (and data displayed thereon) may be seen through the base 12. It is to be understood that the base 12 is configured such that no opaque components of the base protrude into the window 28. The window 28 may be covered by a plastic or glass pane 32 that can be clear and/or that can be magnifying of the image on the exposed portion 30 of the screen. Or, in the alternate embodiment shown in FIG. 3 a top (or bottom) portion 34 of the screen may extend beyond the top (or bottom) of the periphery of the base 12 when in the closed configuration, so that a viewer can see the portion 34 by simply looking past the base 12. Yet again, as shown in FIG. 4 a side portion 36 of the screen may extend beyond the side of the periphery of the base 12 when in the closed configuration, so that a viewer can see the portion 36 by simply looking past the base 12. As yet another alternative, as shown in FIG. 5 a corner 38 of the base 12 may be removed or may be rendered transparent so that a corner portion 40 of the screen can be seen when in the closed configuration.

In either case, it may now be appreciated that a user can close the computer 10 and still see a portion of the screen, so that the processor 26 can be controlled by means of, e.g., voice recognition to maintain at least (and preferably only) the viewable portion of the screen energized to display information related to, without limitation, cell phone use, music playing, and similar applications that can be executed on the computer 10.

While the particular FOLDABLE COMPUTER WITH PARTIALLY VISIBLE DISPLAY WHEN CLOSED as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:

1. A portable computer, comprising:
   a base supporting a key entry device; and
   a cover supporting a visual display screen and foldably engaged with the base between an open configuration, wherein the key entry device on the base is exposed for user manipulation and the entire screen is exposed for viewing by a user, and a closed configuration, wherein the cover is folded flush against the base and a portion of the screen can be seen when the computer is oriented with the base closest to a viewing person, a transparent magnifying pane being disposed over the portion of the screen in the closed configuration.

2. The computer of claim 1, wherein the base defines a periphery and is formed with a window entirely inside the periphery, the portion of the screen being viewable through the window when the computer is in the closed configuration.

3. The computer of claim 2, comprising a transparent pane disposed in the window.

4. The computer of claim 3, wherein the pane is a magnifying pane.

5. The computer of claim 1, wherein the base defines a periphery and the portion of the screen is viewable in the closed configuration by virtue of extending beyond the periphery.

6. The computer of claim 1, wherein the base defines a periphery and is formed with a window partially defined by a corner of the periphery, the portion of the screen being viewable through the window when the computer is in the closed configuration.

7. A portable computer, comprising:
   a base supporting an input device;
   a cover supporting a screen and pivotably engaged with the base between an open configuration, wherein the input device on the base is exposed for user manipulation and the entire screen is exposed for viewing by a user, and a closed configuration, wherein the cover is folded flush against the base; and
   means for exposing a portion of the screen for viewing when the computer is in the closed configuration, wherein the base defines a periphery and is formed with a window partially defined by a corner of the periphery, the portion of the screen being viewable through the window when the computer is in the closed configuration.

8. The computer of claim 7, wherein the base defines a periphery and the means for exposing includes a window formed entirely inside the periphery, the portion of the screen being viewable through the window when the computer is in the closed configuration.

9. The computer of claim 8, wherein the pane is a magnifying pane.

10. The computer of claim 7, comprising a transparent pane disposed in the window.

11. The computer of claim 7, wherein the base defines a periphery and the means for exposing a portion of the screen for viewing when the computer is in the closed configuration includes the portion extending beyond the periphery.

* * * * *

UNITED STATES PATENT AND TRADEMARK OFFICE
CERTIFICATE OF CORRECTION

PATENT NO. : 7,643,288 B2  Page 1 of 1
APPLICATION NO. : 11/376376
DATED : January 5, 2010
INVENTOR(S) : Langgood et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 705 days.

Signed and Sealed this

Sixteenth Day of November, 2010

David J. Kappos
*Director of the United States Patent and Trademark Office*